US012253813B2

(12) United States Patent
Furuyama

(10) Patent No.: US 12,253,813 B2
(45) **Date of Patent: *Mar. 18, 2025**

(54) IMAGE FORMING APPARATUS AND CONTROL METHOD

(71) Applicant: Toshiba Tec Kabushiki Kaisha, Tokyo (JP)

(72) Inventor: Noboru Furuyama, Odawara Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/462,718

(22) Filed: Sep. 7, 2023

(65) Prior Publication Data

US 2023/0418194 A1 Dec. 28, 2023

Related U.S. Application Data

(60) Continuation of application No. 17/868,292, filed on Jul. 19, 2022, now Pat. No. 11,803,141, which is a (Continued)

(30) Foreign Application Priority Data

Feb. 22, 2019 (JP) ................................ 2019-030354

(51) Int. Cl.
*G03G 15/20* (2006.01)

(52) U.S. Cl.
CPC ..... *G03G 15/2039* (2013.01); *G03G 15/2042* (2013.01)

(58) Field of Classification Search
CPC .......... G03G 15/2039; G03G 15/2042; G03G 15/205; G03G 15/2053
See application file for complete search history.

(56) References Cited

U.S. PATENT DOCUMENTS

| | | | |
|---|---|---|---|
| 8,126,383 | B2 | 2/2012 | Kagawa |
| 9,235,166 | B2 | 1/2016 | Shimura |

(Continued)

FOREIGN PATENT DOCUMENTS

| | | | |
|---|---|---|---|
| JP | 2010-191217 A | 9/2010 | |
| JP | 2015-52669 A | 3/2015 | |

OTHER PUBLICATIONS

Notice of Reasons of Refusal mailed Jun. 28, 2022 in corresponding Japanese Patent Application No. 2019-030354 with English translation, 9 pages.

(Continued)

*Primary Examiner* — Hoang X Ngo
(74) *Attorney, Agent, or Firm* — Kim & Stewart LLP

(57) ABSTRACT

An image forming apparatus includes a fixing device and a control unit. The fixing device includes a heating resistor formed of a positive temperature coefficient material. The control unit energizes the heating resistor with a first energization amount if a temperature of the heating resistor is lower than a predetermined temperature, and energizes the heating resistor with a second energization amount that is higher than the first energization amount if the temperature of the heating resistor is higher than the predetermined temperature.

20 Claims, 6 Drawing Sheets

Related U.S. Application Data continuation of application No. 17/464,542, filed on Sep. 1, 2021, now Pat. No. 11,429,042, which is a division of application No. 17/038,559, filed on Sep. 30, 2020, now Pat. No. 11,281,133, which is a continuation of application No. 16/739,882, filed on Jan. 10, 2020, now Pat. No. 10,831,137.

(56) References Cited

U.S. PATENT DOCUMENTS

| | | | | |
|---|---|---|---|---|
| 9,342,000 | B2 | 5/2016 | Sugiyama | |
| 9,551,962 | B2 | 1/2017 | Campbell et al. | |
| 2010/0209131 | A1 | 8/2010 | Kagawa et al. | |
| 2012/0155937 | A1 | 6/2012 | Hamilton et al. | |
| 2015/0071670 | A1 | 3/2015 | Sugiyama | |
| 2015/0083706 | A1 | 3/2015 | Campbell et al. | |
| 2019/0041780 | A1* | 2/2019 | Takagi | G03G 15/2042 |
| 2019/0212679 | A1 | 7/2019 | Aiba | |

OTHER PUBLICATIONS

Office Action mailed Oct. 28, 2022 in corresponding European Patent Application No. 20158260.8, 5 pages.

* cited by examiner

| STATE INFORMATION | MAXIMUM OUTPUT VALUE | MINIMUM TEMPERATURE | |
|---|---|---|---|
| WARM-UP | 1,300W | 20°C | 151 |
| PRINT-READY | 1,000W | 160°C | 151 |
| ⋮ | ⋮ | ⋮ | ⋮ |

IMAGE FORMING APPARATUS AND CONTROL METHOD

CROSS-REFERENCE TO RELATED APPLICATIONS

This application is a continuation of U.S. patent application Ser. No. 17/868,292, filed on Jul. 19, 2022, which application is a continuation of U.S. patent application Ser. No. 17/464,542, filed on Sep. 1, 2021, now U.S. Pat. No. 11,429,042, issued on Aug. 30, 2022, which application is a divisional of U.S. patent application Ser. No. 17/038,559, filed on Sep. 30, 2020, now U.S. Pat. No. 11,281,133, issued on Mar. 22, 2022, which application is a continuation of U.S. patent application Ser. No. 16/739,882, filed on Jan. 10, 2020, now U.S. Pat. No. 10,831,137, issued on Nov. 10, 2020, which application is based upon and claims the benefit of priority from Japanese Patent Application No. 2019-030354, filed on Feb. 22, 2019, the entire contents of which are incorporated herein by reference.

FIELD

Embodiments described herein relate generally to an image forming apparatus and a control method.

BACKGROUND

In recent years, an on-demand fixing method has been proposed as one technique for reducing power consumption in an image forming apparatus. In such an on-demand fixing method, a film is driven by a rotating member having an elastic layer, and a conveyed sheet and developer are heated by a heater through the film. For such a heater, a material having an electrical resistance that varies according to temperature may be used as a heating element. A specific example of such a material is a positive temperature coefficient (PTC) material. A PTC material has a positive temperature coefficient of resistance (PTCR), i.e., the electrical resistance of the material increases as the temperature increases. When a PTC element is used, if the temperature of the heater rises to some extent, it is not easy to raise the temperature further, and therefore energy savings and safety can be obtained. On the other hand, when a PTC element is used, if the temperature of the heater is low, the resistance value is low, and there is a possibility that more power than expected is consumed.

DETAILED DESCRIPTION

Embodiments provide an image forming apparatus and a control method capable of suppressing the consumption of power by a heater formed of a PTC material.

An image forming apparatus according to one embodiment includes a fixing device and a control unit. The fixing device comprises a heating resistor having a lower electrical resistance at a lower temperature and a higher electrical resistance at a higher temperature. The control unit energizes the heating resistor with a first energization amount if a temperature of the heating resistor is lower than a predetermined temperature, and energizes the heating resistor with a second energization amount that is higher than the first energization amount if the temperature of the heating resistor is higher than the predetermined temperature.

Figure 1:
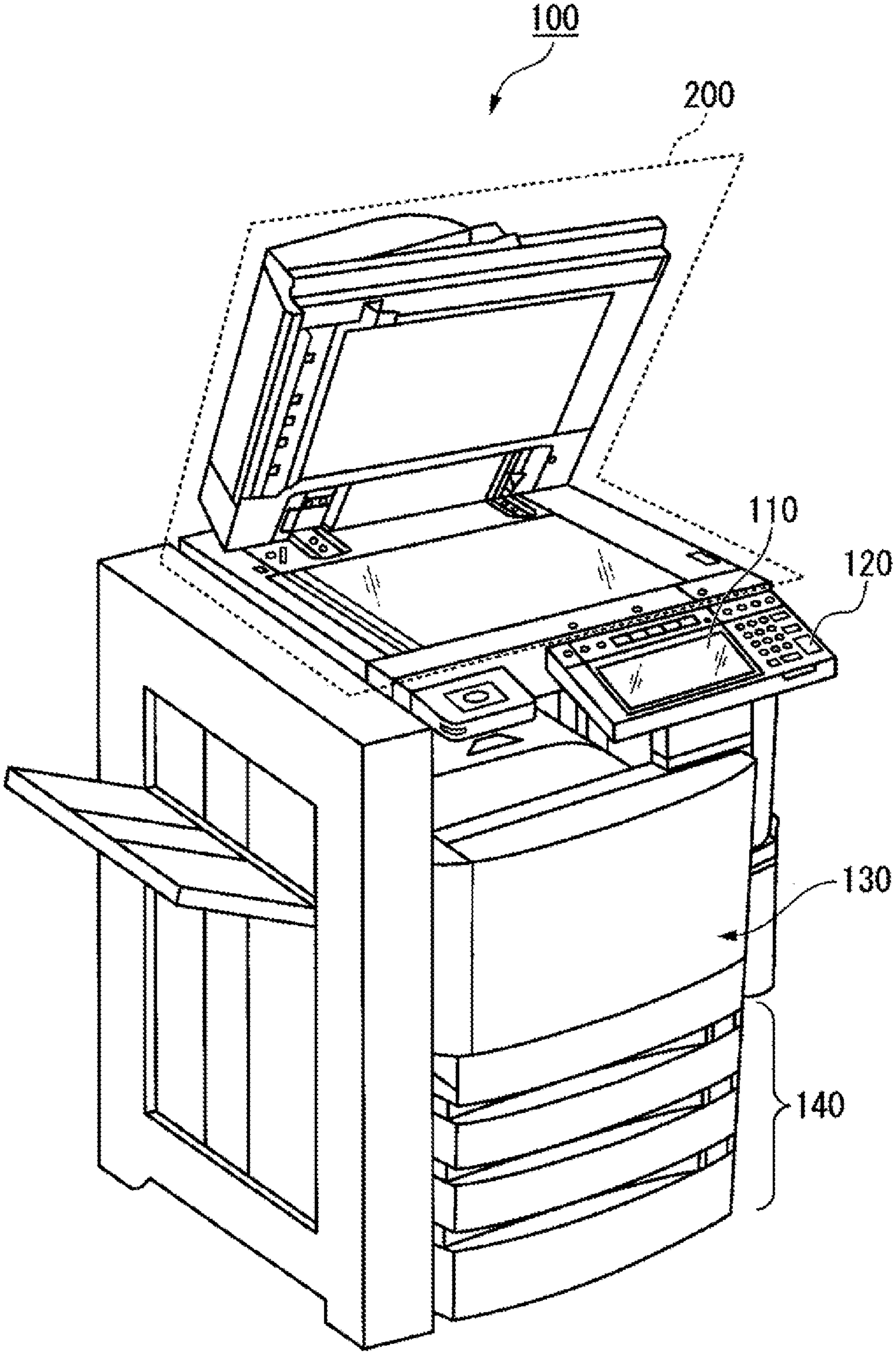
FIG. 1 is a schematic configuration view of an embodiment of an image forming apparatus.
Figure 2:
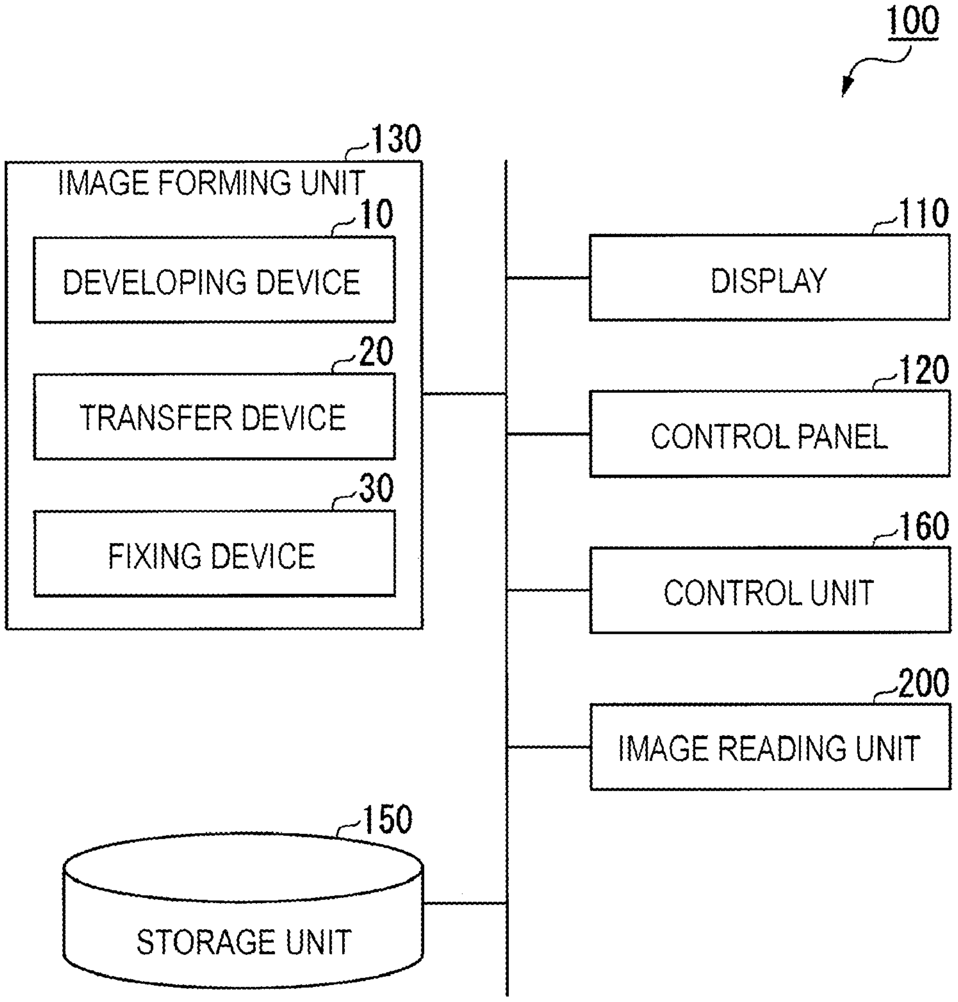
FIG. 2 is a hardware block view of the image forming apparatus.

An image forming apparatus and a control method according to an embodiment will be described with reference to drawings. FIG. 1 is an external view illustrating an overall configuration of an image forming apparatus 100 according to one embodiment. FIG. 2 is a hardware block view of the image forming apparatus 100 according to the embodiment. The image forming apparatus 100 is, for example, a multi-function peripheral. The image forming apparatus 100 includes a display 110, a control panel 120, an image forming unit 130, a sheet housing unit 140, and an image reading unit 200.

The image forming apparatus 100 forms an image on a sheet using a developer such as a toner. The developer is fixed on the sheet by heating. The sheet is, for example, paper or label paper. The sheet may be any material as long as the image forming apparatus 100 may form an image on the surface thereof.

The display 110 is an image display device such as a liquid crystal display or an organic electro luminescence (EL) display. The display 110 displays various information regarding the image forming apparatus 100.

The image forming unit 130 forms an image on a sheet based on image information generated by the image reading unit 200 or image information received via a communication path. The image forming unit 130 includes, for example, a developing device 10, a transfer device 20, and a fixing device 30. The image forming unit 130 forms an image by the following processing, for example. The developing device 10 forms an electrostatic latent image on a photoconductive drum based on the image information. The developing device 10 forms a visible image by attaching a developer to the electrostatic latent image. An example of the developer is a toner. Examples of the toner include a decolorable toner, a non-decolorable toner (ordinary toner), and a decorative toner.

The transfer device 20 transfers the visible image onto the sheet. The fixing device fixes the visible image on the sheet by heating and pressing the sheet. The sheet on which an image is to be formed may be housed in the sheet housing unit 140 or may be set by hand.

The sheet housing unit 140 houses the sheet used for image formation in the image forming unit 130.

A storage unit 150 comprises a storage device such as a magnetic hard disk device or a semiconductor storage device. The storage unit 150 stores data required when the image forming apparatus 100 operates. The storage unit 150 may temporarily store data of images formed in the image forming apparatus 100.

A control unit 160 comprises a processor such as a central processing unit (CPU) and a memory. The control unit 160 reads and executes a program stored in the storage unit 150. The control unit 160 controls the operation of each device provided in the image forming apparatus 100.

The image reading unit 200 reads image information as light brightness. The image reading unit 200 records the image information that is read. The recorded image information may be transmitted to another information processing apparatus via a network. The recorded image information may be formed on a sheet by the image forming unit 130. The image reading unit 200 may include an ADF.

Figure 3:
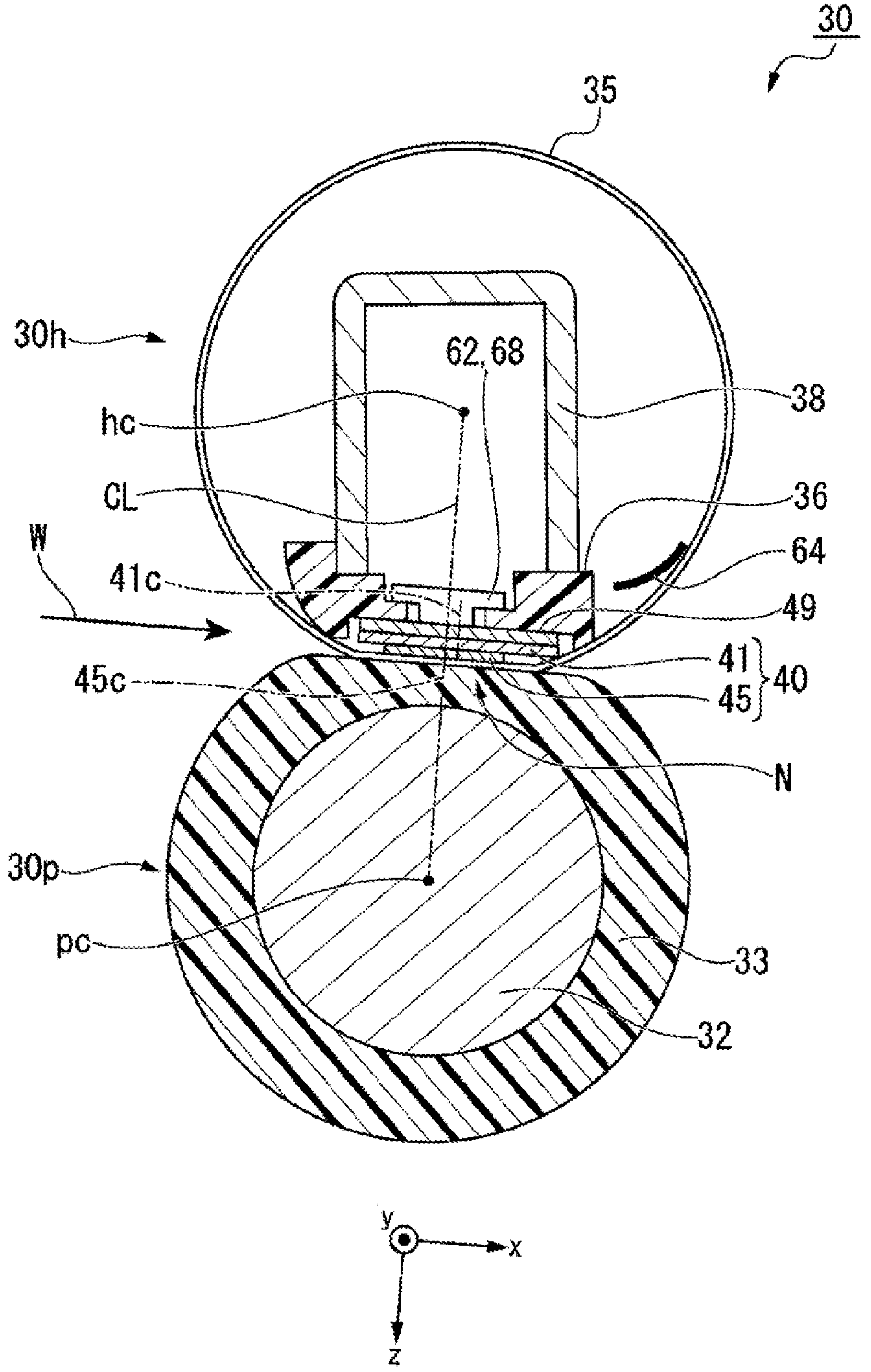
FIG. 3 is a front sectional view of a fixing device.

FIG. 3 is a front sectional view of the fixing device 30 of the embodiment. The fixing device 30 of the embodiment includes a pressure roller 30*p* and a film unit 30*h*.

The pressure roller 30*p* is rotatably driven and can press against the film unit 30*h*. The pressure roller 30*p* forms a nip N with the film unit 30*h* when the pressure roller 30*p* is pressed against the film unit 30*h*. The pressure roller 30*p* presses the visible image of the sheet that entered the nip N. When the pressure roller 30*p* is driven to rotate, the pressure roller 30*p* conveys the sheet along with the rotation. The pressure roller 30*p* includes, for example, a cored bar 32, an elastic layer 33, and a release layer (not shown).

The cored bar 32 is formed in a cylindrical shape from a metal material such as stainless steel. Both ends in the axial direction of the cored bar 32 are rotatably supported. The cored bar 32 is rotationally driven by a motor (not shown). The cored bar 32 is in contact with a cam member (not shown).

The elastic layer 33 is formed of an elastic material such as silicone rubber. The elastic layer 33 is formed on the outer peripheral surface of the cored bar 32 with a constant thickness.

The release layer (not shown) is formed of a resin material such as a tetrafluoroethylene and perfluoroalkyl vinyl ether copolymer (PFA). The release layer is formed on the outer peripheral surface of the elastic layer 33. The hardness of the outer peripheral surface of the pressure roller 30*p* is preferably 40° to 70° under a load of 9.8 N with an ASKER-C hardness meter. This ensures the area of the nip N and the durability of the pressure roller 30*p*.

The pressure roller 30*p* can approach and be separated from the film unit 30*h* by the rotation of the cam member. When the pressure roller 30*p* approaches the film unit 30*h*, the nip N is formed by the pressure roller 30*p* being pressed against the film unit 30*h* by a pressure spring. When the image formation is not executed, such as in a sleep state, the pressure roller is separated from the film unit 30*h*. By separating the pressure roller 30*p* from the film unit 30*h*, for example, it is possible to prevent the parts constituting the pressure roller 30*p* or the film unit 30*h* from being plastically deformed.

The pressure roller 30*p* is rotationally driven by a motor. When the pressure roller 30*p* rotates with the nip N formed, a cylindrical film 35 of the film unit 30*h* is driven to rotate. The pressure roller 30*p* conveys the sheet in a conveyance direction W by rotating in a state where the sheet is disposed in the nip N.

The film unit 30*h* heats the visible image of the sheet that entered the nip N. The film unit 30*h* includes the cylindrical film (cylindrical body) 35, a heater 40, a heat transfer member 49, a support member 36, a stay 38, a heater thermometer 62, a thermostat 68, and a film thermometer 64.

The cylindrical film 35 is formed in a cylindrical shape. The cylindrical film 35 includes a base layer, an elastic layer, and a release layer in order from the inner peripheral side. The base layer is formed in a cylindrical shape from a material such as nickel (Ni). The elastic layer is laminated on the outer peripheral surface of the base layer. The elastic layer is formed of an elastic material such as silicone rubber. The release layer is laminated on the outer peripheral surface of the elastic layer. The release layer is formed of a material such as a PFA resin.

Figure 4:
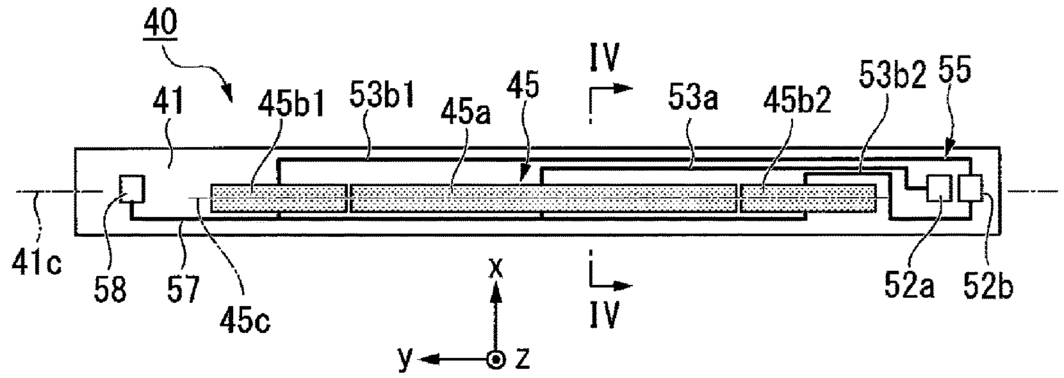
FIG. 4 is a bottom view of a heater unit (viewed from a +z direction)
Figure 5:
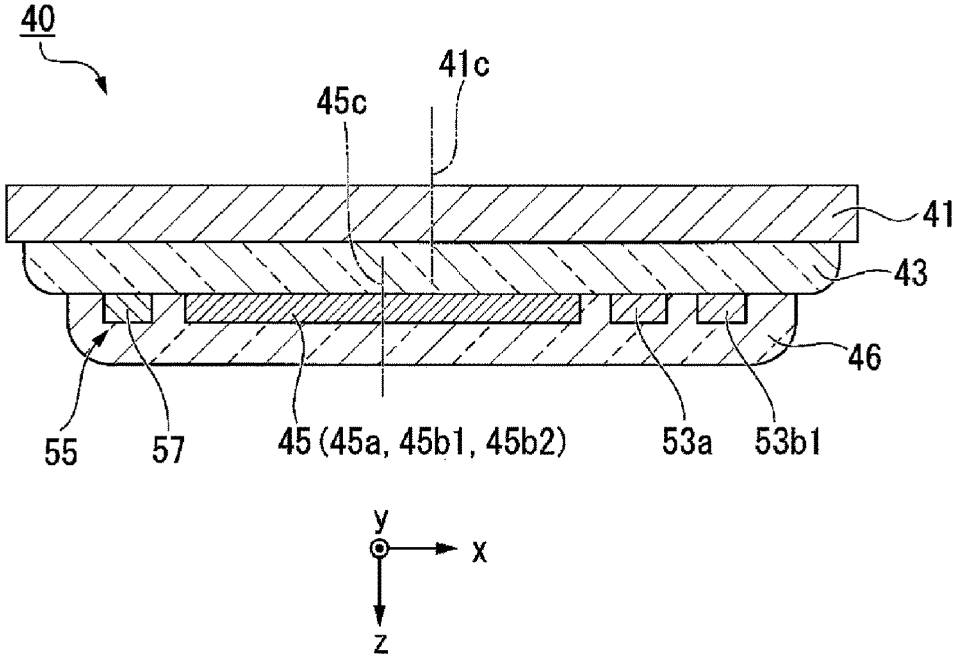
FIG. 5 is a front sectional view of the heater unit taken along the line IV-IV in FIG. 4.

FIG. 4 is a bottom view of the heater 40 (viewed from a +z direction). FIG. 5 is a front sectional view of the heater 40 taken along the line IV-IV in FIG. 4. The heater 40 includes a substrate (heating element substrate) 41, a heating element set 45, and a wiring set 55. Hereinafter, the heater 40 will be described. In the following description, an x direction, a y direction, and a z direction are defined as follows: The y direction is the longitudinal direction of the heating element substrate 41. The y direction is parallel to the width direction of the cylindrical film 35. A +y direction is a direction from a central heating element 45*a* toward a first end heating element 45*b*1. The x direction is the width direction of the heating element substrate 41, and a +x direction is the sheet conveyance direction (downstream direction). The z direction is the normal direction of the heating element substrate 41, and the +z direction is the direction in which the heating element set 45 is disposed with respect to the heating element substrate 41. An insulating layer 43 is formed on the surface of the heating element substrate 41 in the +z direction by a glass material or the like.

The heating element substrate 41 is formed of a metal material such as stainless steel or nickel, or a ceramic material such as aluminum nitride. The heating element substrate 41 is formed in a long and thin rectangular plate shape. The heating element substrate 41 is disposed inside the periphery of the cylindrical film 35 in the radial direction. In the heating element substrate 41, the axial direction of the cylindrical film corresponds to the longitudinal direction of the heating element substrate 41.

The heating element set 45 is disposed on the heating element substrate 41. The heating element set 45 is formed on the surface of the insulating layer 43 in the +z direction, for example, as illustrated in FIG. 5. The heating element set 45 is formed by using a heating resistor such as silver and palladium alloy. The heating resistor used in the heating element set is configured by using a variable resistance material. The heating resistor is formed of a Positive Temperature Coefficient (PTC) material having an electrical resistance that increases as the temperature increases. The outer shape of the heating element set 45 is formed in a rectangular shape in which the y direction is the longitudinal direction and the x direction is the width direction.

The heating element set 45 may be configured by as a plurality of heating elements. For example, as illustrated in FIG. 4, the heating element set 45 includes the first end heating element 45*b*1, the central heating element 45*a*, and a second end heating element which are arranged side by side in the y direction. The central heating element 45*a* is disposed at a central part of the heater 40 in the y direction of the heating element set 45. The central heating element 45*a* may be configured as a plurality of small heating elements arranged side by side in the y direction. The first end heating element 45*b*1 is disposed in the +y direction of the central heating element 45*a* and at the end of the heating element set 45 in the +y direction. The second end heating element is disposed in the −y direction of the central heating element 45*a* and at the end of the heating element set 45 in the −y direction. The boundary line between the central heating element 45*a* and the first end heating element may be disposed in parallel to the x direction or may be disposed to intersect the x direction. The same applies to the boundary line between the central heating element 45*a* and the second end heating element 45*b*2.

A sheet having a small width in the y direction passes through the nip N of the fixing device 30. In this case, the control unit 160 causes only the central heating element 45*a* to generate heat. On the other hand, the control unit 160 causes the entire heating element set 45 to generate heat in the case of a sheet having a large width in the y direction. Therefore, the central heating element 45*a*, the first end heating element 45*b*1, and the second end heating element 45*b*2 are controlled to generate heat independently of each other. The first end heating element 45*b*1 and the second end heating element 45*b*2 are similarly controlled in heat generation.

The wiring set 55 is formed of a metal material such as silver. The wiring set 55 includes a central contact 52*a*, a central wiring 53*a*, an end contact 52*b*, a first end wiring 53*b*1, a second end wiring 53*b*2, a common contact 58, and a common wiring 57.

The central contact 52*a* is disposed in the −y direction of the heating element set 45. The central wiring 53*a* is disposed in the +x direction of the heating element set 45. The central wiring 53*a* connects the end side of the central heating element 45*a* in the +x direction and the central contact 52*a*.

The end contact 52*b* is disposed in the −y direction of the central contact 52*a*. The first end wiring 53*b*1 is disposed in the +x direction of the heating element set 45 and in the +x direction of the central wiring 53*a*. The first end wiring 53*b*1 connects the end side of the first end heating element 45*b*1 in the +x direction and the end of the end contact 52*b* in the +x direction. The second end wiring 53*b*2 is disposed in the +x direction of the heating element set 45 and in the −x direction of the central wiring 53*a*. The second end wiring 53*b*2 connects the end side of the second end heating element 45*b*2 in the +x direction and the end of the end contact 52*b* in the −x direction.

The common contact 58 is disposed in the +y direction of the heating element set 45. The common wiring 57 is disposed in the −x direction of the heating element set 45. The common wiring 57 connects the common contact 58 to the side ends of the central heating element 45*a*, the first end heating element 45*b*1, and the second end heating element 45*b*2 in the −x direction.

Thus, the second end wiring 53*b*2, the central wiring 53*a*, and the first end wiring 53*b*1 are disposed in the +x direction of the heating element set 45. On the other hand, only the common wiring 57 is disposed in the −x direction of the heating element set 45. Therefore, a center 45*c* of the heating element set 45 in the x direction is disposed in the −x direction from a center 41*c* of the heating element substrate 41 in the x direction.

As illustrated in FIG. 3, a straight line CL extending through a center pc of the pressure roller 30*p* and a center hc of the film unit 30*h* is defined. The center 41*c* of the heating element substrate 41 is disposed in the +x direction from the straight line CL. Thereby, since the heating element substrate 41 extends in the +x direction of the nip N, the sheet that passed through the nip N is easily peeled off from the film unit 30*h*.

The center 45*c* of the heating element set 45 in the x direction is disposed on the straight line CL. The heating element set 45 is entirely included in the region of the nip N and is disposed at the center of the nip N. Thereby, the heat distribution in the nip N becomes uniform, and the sheet passing through the nip N is heated evenly.

As illustrated in FIG. 5, the heating element set 45 and the wiring set 55 are formed on the surface of the insulating layer 43 in the +z direction. A protective layer 46 is formed of a glass material or the like to cover the heating element set 45 and the wiring set 55. The protective layer 46 improves the ability of the cylindrical film 35 to slide over the heater it is rotated by engagement with the rotating pressure roller 30*p*.

As illustrated in FIG. 3, the heater 40 is disposed inside the periphery of the cylindrical film 35. A lubricant (not shown) is applied to the inner peripheral surface of the cylindrical film 35. The heater 40 is in contact with the inner peripheral surface of the cylindrical film 35 via the lubricant. When the heater 40 generates heat, the viscosity of the lubricant decreases. Thereby, the ability of the cylindrical film 35 to slide over the heater is ensured. Thus, the cylindrical film 35 is a strip-shaped thin film that slides on the surface of the heater 40 while contacting the heater unit 40 on one surface.

The heat transfer member 49 is formed of a metal material having a high thermal conductivity such as copper. The outer shape of the heat transfer member 49 corresponds to the outer shape of the heating element substrate 41 of the heater 40. The heat transfer member 49 is disposed in contact with the surface of the heating element substrate 41 in the −z direction of the heater 40. By providing the heat transfer member 49, it is possible to make the temperatures of a plurality of heating elements (for example, the central heating element 45*a*, the first end heating element 45*b*1, and the second end heating element 45*b*2) substantially uniform.

The support member 36 is formed of a resin material such as a liquid crystal polymer. The support member 36 is disposed so as to cover both sides of the heater 40 in the −z direction and the x direction. The support member 36 supports the heater 40 via the heat transfer member 49. Round chamfers are formed at both ends of the support member 36 in the x direction. The support member 36 supports the inner peripheral surface of the cylindrical film 35 at both ends of the heater 40 in the x direction.

The stay 38 is formed of a steel plate material or the like. The cross section perpendicular to the y direction of the stay 38 may be formed in a U shape, for example. The stay 38 is mounted in the −z direction of the support member 36 so as to close the U-shaped opening with the support member 36. The stay 38 extends in the y direction. Both ends of the stay 38 in the y direction are fixed to the housing of the image forming apparatus 100. As a result, the film unit 30*h* is supported by the image forming apparatus 100. The stay 38 improves the bending rigidity of the film unit 30*h*. Flanges (not shown) that restrict the movement of the cylindrical film 35 in the y direction are mounted near the both ends of the stay 38 in the y direction.

The heater thermometer 62 is disposed in the vicinity of the heater 40. An example of the heater thermometer 62 will be described. The heater thermometer 62 may be disposed in the −z direction of the heater 40 with the heat transfer member 49 interposed therebetween. The heater thermometer 62 is a thermistor. The heater thermometer 62 is mounted and supported on the surface of the support member 36 in the −z direction. The temperature sensing element of the heater thermometer 62 contacts the heat transfer member 49 through a hole penetrating the support member 36 in the z direction. The heater thermometer 62 measures the temperature of the heater 40 via the heat transfer member 49. In the following description, the temperature measured by the heater thermometer 62 is referred to as a "measured temperature". The measured temperature may be measured as the temperature of the heater 40, may be measured as the temperature of the heating element set 45, may be measured as the temperature of the central heating element 45*a*, or may be measured as a statistical value (for example, an average value) of a plurality of heating elements. The heater thermometer 62 may comprise a plurality of thermometers. The heater thermometer 62 may comprise, for example, a central heater thermometer that measures the temperature of the central heating element and an end thermometer that measures the temperature of one or both of the first end heating element 45*b*1 and the second end heating element 45*b*2.

The thermostat 68 is disposed in the same manner as the heater thermometer 62. The thermostat 68 is incorporated in an electric circuit described later. The thermostat 68 cuts off the power supply to the heating element set if the temperature of the heater 40 detected via the heat transfer member 49 exceeds a predetermined temperature.

Figure 6:
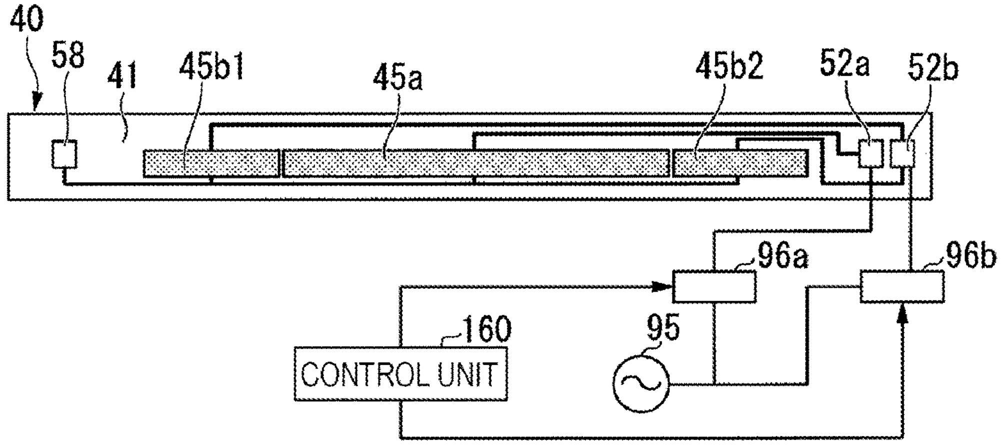
FIG. 6 is an electric circuit view of the fixing device.

FIG. 6 is an electric circuit view of the fixing device 30 of the embodiment. FIG. 6 illustrates only the configuration related to the control of the heating element set 45 in particular.

A power source 95 is connected to the central contact 52*a* via a central triac 96*a*. The power source 95 is connected to the end contact 52*b* via an end triac 96*b*. The control unit 160 controls ON and OFF of the central triac 96*a* and the end triac 96*b* independently of each other. When the control unit 160 turns on the central triac 96*a*, power is supplied from the power source 95 to the central heating element 45*a*. As a result, the central heating element 45*a* generates heat. When the control unit 160 turns on the end triac 96*b*, power is supplied from the power source 95 to the first end heating element and the second end heating element 45*b*2. As a result, the first end heating element 45*b*1 and the second end heating element 45*b*2 generate heat. As described above, the central heating element the first end heating element 45*b*1, and the second end heating element 45*b*2 are controlled to generate heat independently.

The control unit 160 controls the power supplied to the heating element set 45. The control unit 160 controls the power supplied to the central heating element 45*a*, for example, by the central triac 96*a*. The control unit 160 controls the power supplied to the first end heating element 45*b*1 and the second end heating element 45*b*2, for example, by the end triac 96*b*. The electric power control may be realized by controlling the energization amount. The control of the energization amount may be realized by phase control, for example, or may be realized by wave number control.

The rate of change in resistance per degree of temperature of the heating resistor is called a temperature coefficient of resistance. If the temperature coefficient of resistance is defined as αTCR (ppm), a consumed power P can be defined as shown in Equation 1 below. $P=P0/(1+(\alpha TCR/1000000)\times(T-T0))$ . . . (Equation 1)

In Equation 1, T0 is a reference temperature (° C.), T is an arbitrary temperature (° C.), P0 is an output (W) at the reference temperature, and P is an output (W) at the arbitrary temperature.

Figures 7, 8:
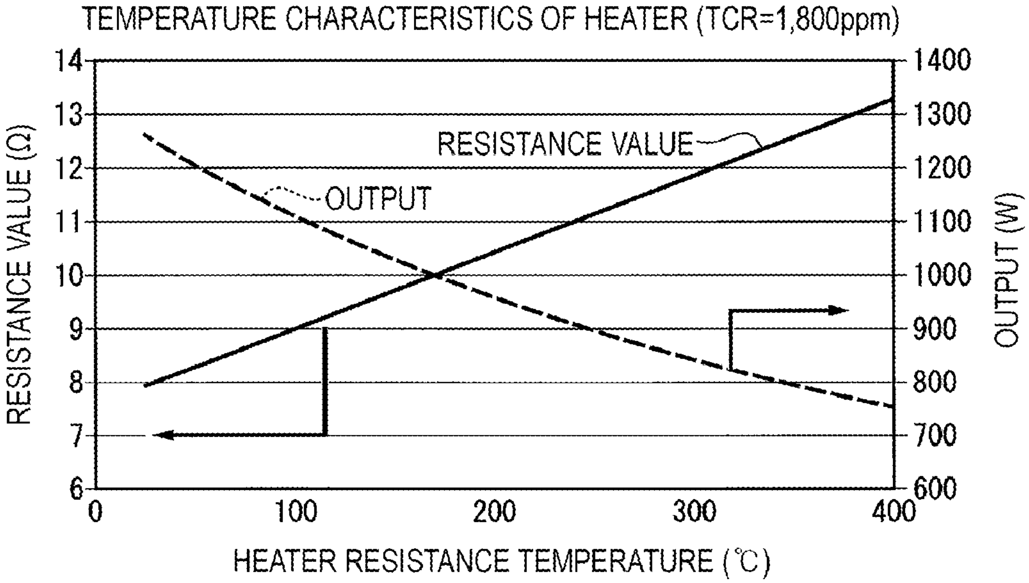
FIG. 7 is a view illustrating example characteristics of heating resistance elements used in a heating element set and the characteristics of an output of the heating element set.
FIG. 8 is a view illustrating an example of a minimum temperature table used for an operation of a control unit.

FIG. 7 is a view illustrating an example of the characteristics of the heating resistance elements used in the heating element set 45 and the characteristics of the output of the heating element set 45. In FIG. 7, the temperature coefficient of resistance is 1800, and a duty ratio is 100%. As illustrated in FIG. 7, the higher the temperature of the heating element (heater resistance temperature), the higher the resistance value of the heating element. On the other hand, the higher the temperature of the heating element (heater resistance temperature), the lower the output value from the heating element. When the duty ratio becomes low, the output graph illustrated in FIG. 7 becomes low accordingly.

The operation of the control unit 160 will be described in detail based on the characteristics illustrated in FIG. 7. The fixing device 30 of the image forming apparatus 100 has a predetermined maximum output value (hereinafter, referred to as "maximum output value") that can be used by the fixing device 30 in accordance with the state of the image forming apparatus 100. For example, in a warm-up state, a relatively high maximum output value is set as compared with the case of a preparation state of image formation (hereinafter, referred to as "print-ready state"). The reason is that, in the warm-up state, fewer devices need to be driven in the image forming apparatus 100 than in the print-ready state. That is, if there are few devices that need to be driven in this way, more power can be allocated to the fixing device 30. On the other hand, in the print-ready state, it is necessary to supply power to various devices other than the fixing device 30 (for example, the developing device 10, the transfer device 20, and a conveyance roller). Therefore, in the print-ready state, the power (maximum output value) that can be allocated to the fixing device 30 is lower than that in the warm-up state.

Based on the above characteristics, the control unit 160 operates as follows. The control unit 160 controls the energization amount of the fixing device 30 to the heating element set 45 so that the output from the fixing device 30 does not exceed the maximum output value determined according to the state of the image forming apparatus 100. An example of the operation of the control unit 160 will be described below.

The control unit 160 performs a normal, or second, operation if the current measured temperature of the heating element set 45 is equal to or higher than the minimum temperature corresponding to the state of the image forming apparatus 100. In the normal operation, the energization amount for the heating element set 45 is controlled to a normal, or second, energization amount (for example, the energization amount with a duty ratio of 100%). In the normal operation, processing according to the state is executed. For example, in the warm-up state, the energization amount for the heater unit 40 of the fixing device 30 is controlled to the normal energization amount, and the heater is heated. For example, in the print-ready state, standby power is supplied to each device of the image forming unit 130 and controlled to the print-ready state. For example, in a printing state, predetermined power is supplied to each device of the image forming unit 130, and the image forming unit 130 executes image forming processing (printing operation) on a sheet.

On the other hand, if the current measured temperature of the heating element set is lower than the minimum temperature corresponding to the state of the image forming apparatus 100, the control unit 160 performs a preliminary, or first, operation. In the preliminary operation, the energization amount for the heating element set 45 is controlled to a preliminary, or first, energization amount. The preliminary energization amount is a current amount lower than the normal energization amount. The preliminary energization amount may be, for example, a duty ratio of 50%, or a duty ratio of 30%.

FIG. 8 is a view illustrating an example of the minimum temperature table used for the operation of the control unit 160. The minimum temperature table is stored in the storage unit 150, for example. The minimum temperature table has a plurality of minimum temperature records 151. The minimum temperature records 151 each includes state information, a maximum output value, and a minimum temperature value. The state information is information indicating the state of the image forming apparatus 100. The maximum output value is the maximum value of output assigned to the fixing device 30 if the state information indicates a state. The minimum temperature is a value determined based on the characteristics of the element used for the heating element of the fixing device 30. The minimum temperature is the temperature of the heating element if the output in the operation with the normal energization amount becomes the maximum output value of the same minimum temperature record 151. If the temperature of the heating element is higher than the minimum temperature of the minimum temperature record 151, the output does not exceed the maximum output value when controlled by the normal energization amount. On the other hand, if the temperature of the heating element is lower than the minimum temperature of the minimum temperature record 151, there is a possibility that the output exceeds the maximum output value when controlled by the normal energization amount. Therefore, as described above, if the temperature of the heating element is lower than the minimum temperature determined according to the state information, the heating element is controlled with the preliminary energization amount that is lower than the normal energization amount.

Figure 9:
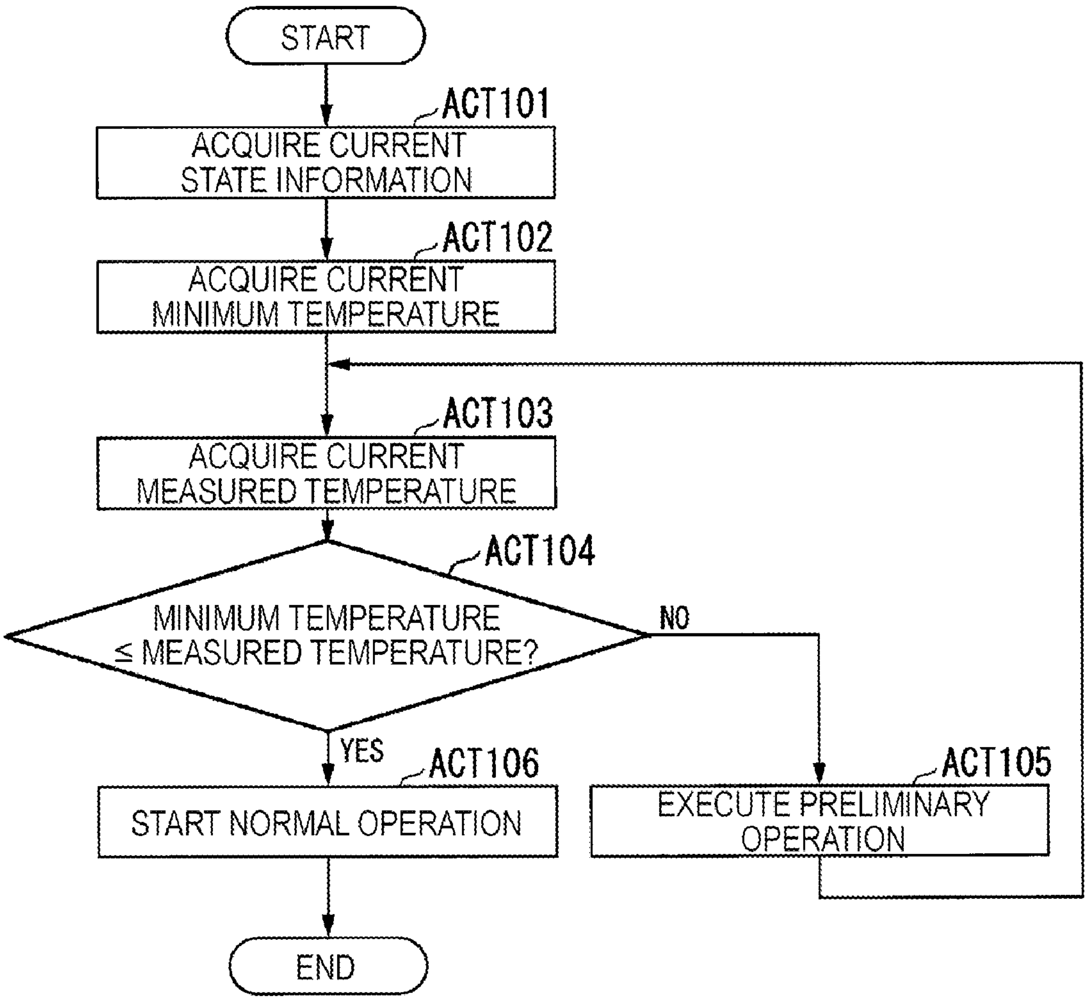
FIG. 9 is a flowchart illustrating an example of an operation flow of the control unit.

FIG. 9 is a flowchart illustrating an example of the operation flow of the control unit 160. When a predetermined timing arrives, the control unit 160 acquires current state information (ACT 101). For example, state information indicating a new state may be acquired at a timing when the operation state of the image forming apparatus 100 is changed. For example, the current state information may be acquired at a predetermined cycle. The control unit 160 refers to the minimum temperature table to acquire the minimum temperature corresponding to the current state information acquired in ACT 101 (ACT 102).

The control unit 160 acquires a current measured temperature (ACT 103). If the measured temperature is lower than the minimum temperature (ACT 104-NO), the control unit 160 executes a preliminary operation (ACT 105). In the preliminary operation, the control unit 160 controls the energization amount for the heating element set 45 to the preliminary energization amount. By performing the preliminary operation, the heater 40 generates heat at an output value that does not exceed the maximum output value, and the temperature of the heating element set of the heater unit 40 rises. As the temperature of the heating element set 45 rises, the electrical resistance of the heating element set 45 increases. Thereafter, the control unit 160 repeatedly executes the processing of ACT 103 to ACT 105 at a predetermined timing. When the measured temperature is equal to or higher than the minimum temperature (ACT 104—YES), the control unit 160 starts a normal operation (ACT 106). Note that, it is not always necessary to execute the preliminary operation. If the measured temperature is equal to or higher than the minimum temperature in the first executed ACT 104, the normal operation may be started without executing the preliminary operation.

All or part of the operation of the control unit 160 may be realized by using hardware such as an application specific integrated circuit (ASIC), programmable logic device (PLD), and field programmable gate array (FPGA). The program may be recorded on a computer-readable recording medium. The computer-readable recording medium is, for example, a portable medium such as a flexible disk, a magneto-optical disk, a ROM, or a CD-ROM, or a storage device such as a hard disk built in the computer system. The program may be transmitted via an electric communication line.

According to at least one embodiment described above, if the measured temperature (the temperature of the heater 40) is lower than the minimum temperature determined by the state information of the image forming apparatus 100, a preliminary operation with a lower energization amount than in a normal operation is executed. When the measured temperature becomes higher than the minimum temperature by the preliminary operation, the normal operation is started. Therefore, the maximum power consumption of the image forming apparatus 100 can be suppressed within the rating. By controlling the maximum power in this way, it is possible to suppress the occurrence of inrush current to the heater unit 40 and reduce flicker.

Modification Example

In the embodiment described above, the preliminary energization amount is a single value. However, a plurality of values may be set for the preliminary energization amount. In this case, the preliminary energization amount actually used in the preliminary operation may be determined from a plurality of values according to the measured temperature at that time. For example, a first preliminary energization amount, a second preliminary energization amount, . . . , an n-th preliminary energization amount (n is an integer greater than 2) may be set in advance from the largest energization amount, and any of the preliminary energization amounts may be determined according to the measured temperature. As the measured temperature is higher, the preliminary energization amount with a larger energization amount is determined. By controlling in this way, it is possible to control the measured temperature to the minimum temperature or more in a shorter time while keeping the maximum power consumption of the image forming apparatus 100 within the rating.

In the above-described embodiment, the fixing device 30 is mounted by an on-demand fixing method. However, as long as the heating element is mounted by using a PTC material, the mounting of the fixing device 30 may be another method. For example, the fixing device 30 may be mounted by a method using a heat roller and a press roller.

If the heating element set 45 is configured by a plurality of heating elements, the control unit 160 may be configured to heat each heating element independently. In this case, the thermometer 62 may be disposed so that the temperature of each heating element can be measured. The control unit 160 may individually determine the energization amount for each heating element based on the temperature of each heating element. By controlling in this way, finer temperature control is possible. The control unit 160 may tentatively determine the energization amount for each heating element and control all the heating elements by using the lowest energization amount among the determined energization amounts. With this configuration, safer control is possible. In other words, if any one of the thermistors shows a high temperature due to a failure or the like, when the control is performed based on the value, the maximum output value may be exceeded, but such a problem can be solved.

The control unit 160 may cause each heating element to generate heat in turn from the heating elements located at the end of the heating element set to the heating element located at the center of the heating element set. Further, the control unit 160 may cause each heating element to generate heat in turn from the heating element located at the center of the heating element set to the heating elements located at the ends of the heating element set.

The control unit 160 may start the heat generation in order from the heating element having the lowest measured value of the thermometer 62 among the heating elements. The control unit 160 may perform control so that the energization amount is the same value for each heating element.

While certain embodiments have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus comprising:
- a film with which a nip is formed, the film extending in a longitudinal direction;
- a resistor formed of a positive temperature coefficient material, the resistor being provided on a side of the film opposite to the nip and configured to generate heat;
- a heat transfer member formed of metal and configured to transfer the heat generated by the resistor in the longitudinal direction, the heat transfer member including a first surface facing the resistor and a second surface opposite to the first surface, the resistor being disposed between the first surface of the heat transfer member and the nip;
- a thermometer configured to measure a temperature of the heat transfer member; and
- a controller configured to control an energization amount for the resistor according to the temperature measured by the thermometer.

2. The image forming apparatus according to claim 1, wherein the controller
- energizes the resistor with a first energization amount when the temperature of the heat transfer member is a first temperature, and
- energizes the resistor with a second energization amount higher than the first energization amount when the temperature of the heat transfer member is a second temperature higher than the first temperature.

3. The image forming apparatus according to claim 1, wherein the controller
- energizes the resistor with a first energization amount if the temperature of the heat transfer member is lower than a predetermined temperature, and
- energizes the resistor with a second energization amount higher than the first energization amount if the temperature of the heat transfer member is higher than the predetermined temperature.

4. The image forming apparatus according to claim 1, wherein the controller
- energizes the resistor with a first duty ratio when the temperature of the heat transfer member is a first temperature; and
- energizes the resistor with a second duty ratio higher than the first duty ratio when the temperature of the heat transfer member is a second temperature higher than the first temperature.

5. The image forming apparatus according to claim 4, wherein the first duty ratio is 100% and the second duty ratio is 50% or less.

6. The image forming apparatus according to claim 1, wherein the controller
- energizes the resistor with a first duty ratio if the temperature of the heat transfer member is lower than a predetermined temperature, and
- energizes the resistor with a second duty ratio higher than the first duty ratio if the temperature of the heat transfer member is higher than the predetermined temperature.

7. The image forming apparatus according to claim 6, wherein the first duty ratio is 100% and the second duty ratio is 50% or less.

8. The image forming apparatus according to claim 1, wherein
- the thermometer is provided on the second surface of the heat transfer member.

9. The image forming apparatus according to claim 8, wherein the thermometer is in contact with the second surface of the heat transfer member.

10. The image forming apparatus according to claim 1, further comprising:
- a power source; and
- a switching element between the power source and the resistor, wherein
- the controller is configured to control the energization amount for the resistor by turning the switching element ON to supply power from the power source to the resistor and OFF to cut off power from the power source to the resistor.

11. An image forming apparatus comprising:
- a film with which a nip is formed, the film extending in a longitudinal direction;
- a resistor formed of a positive temperature coefficient material, the resistor being provided on a side of the film opposite to the nip and configured to generate heat;
- a heat transfer member formed of metal and configured to transfer the heat generated by the resistor in the longitudinal direction, the heat transfer member including a first surface facing the resistor and a second surface opposite to the first surface, the resistor being disposed between the first surface of the heat transfer member and the nip;
- a thermometer in contact with the heat transfer member; and
- a controller configured to control an energization amount for the resistor according to a temperature measured by the thermometer.

12. The image forming apparatus according to claim 11, further comprising:
- a power source; and
- a switching element between the power source and the resistor, wherein
- the controller is configured to control the energization amount for the resistor by turning the switching element ON to supply power from the power source to the resistor and OFF to cut off power from the power source to the resistor.

13. The image forming apparatus according to claim 12, wherein the controller
- energizes the resistor with a first energization amount when the temperature measured by the thermometer is a first temperature, and
- energizes the resistor with a second energization amount higher than the first energization amount when the temperature measured by the thermometer is a second temperature higher than the first temperature.

14. The image forming apparatus according to claim 12, wherein the controller energizes the resistor with a first energization amount if the temperature measured by the thermometer is lower than a predetermined temperature, and energizes the resistor with a second energization amount higher than the first energization amount if the temperature measured by the thermometer is higher than the predetermined temperature.

15. The image forming apparatus according to claim 12, wherein the controller energizes the resistor with a first duty ratio when the temperature measured by the thermometer is a first temperature; and energizes the resistor with a second duty ratio higher than the first duty ratio when the temperature measured by the thermometer is a second temperature higher than the first temperature.

16. The image forming apparatus according to claim 15, wherein the first duty ratio is 100% and the second duty ratio is 50% or less.

17. The image forming apparatus according to claim 12, wherein the controller energizes the resistor with a first duty ratio if the temperature measured by the thermometer is lower than a predetermined temperature, and energizes the resistor with a second duty ratio higher than the first duty ratio if the temperature measured by the thermometer is higher than the predetermined temperature.

18. The image forming apparatus according to claim 17, wherein the first duty ratio is 100% and the second duty ratio is 50% or less.

19. The image forming apparatus according to claim 11, wherein the resistor has a central part and a pair of end parts that are controlled by the controller separately.

20. The image forming apparatus according to claim 19, further comprising:

a power source;

a first switching element between the power source and the central part of the resistor; and a second switching element between the power source and the end parts of the resistor, wherein the controller is configured to control the energization amount for the central part of the resistor by turning the first switching element ON to supply power from the power source to the central part of the resistor and OFF to cut off power from the power source to the central part of the resistor, and the controller is configured to control the energization amount for the end parts of the resistor by turning the second switching element ON to supply power from the power source to the end parts of the resistor and OFF to cut off power from the power source to the end parts of the resistor.

* * * * *